United States Patent
Mosher et al.

(10) Patent No.: US 10,392,998 B2
(45) Date of Patent: Aug. 27, 2019

(54) COMBINING MODEL AND DELTA PRESSURE BASED SOOT LOAD ESTIMATES

(71) Applicants: Jordan Mosher, Gig Harbor, WA (US); Nishant Singh, Bothell, WA (US); Andrew McBride, Mount Vernon, WA (US)

(72) Inventors: Jordan Mosher, Gig Harbor, WA (US); Nishant Singh, Bothell, WA (US); Andrew McBride, Mount Vernon, WA (US)

(73) Assignee: PACCAR INC, Bellevue, WA (US)

( * ) Notice: Subject to any disclaimer, the term of this patent is extended or adjusted under 35 U.S.C. 154(b) by 529 days.

(21) Appl. No.: 14/924,399

(22) Filed: Oct. 27, 2015

(65) Prior Publication Data
US 2017/0114695 A1    Apr. 27, 2017

(51) Int. Cl.
| B01D 46/44 | (2006.01) |
| F01N 11/00 | (2006.01) |
| G01M 15/10 | (2006.01) |

(52) U.S. Cl.
CPC ............ *F01N 11/00* (2013.01); *G01M 15/102* (2013.01); *B01D 46/44* (2013.01); *F01N 2550/04* (2013.01); *F01N 2900/1606* (2013.01)

(58) Field of Classification Search
CPC .......... G01M 15/102; F01N 2900/1606; F01N 11/00; F01N 2550/04; B01D 46/44
See application file for complete search history.

(56) References Cited

U.S. PATENT DOCUMENTS

| 6,735,941 | B2 | 5/2004 | Saito et al. |
| 8,966,880 | B2 | 3/2015 | Gerty |
| 2004/0200271 | A1* | 10/2004 | van Nieuwstadt ............... B01D 46/0036 73/114.78 |
| 2007/0056272 | A1* | 3/2007 | Dollmeyer .............. F01N 3/035 60/297 |
| 2011/0209460 | A1* | 9/2011 | He .......................... F01N 9/002 60/274 |
| 2012/0174653 | A1* | 7/2012 | Ikawa ...................... F01N 3/021 73/23.33 |

(Continued)

OTHER PUBLICATIONS

Rose, D., and T. Boger, "Different Approaches to Soot Estimation as Key Requirement for DPF Applications," SAE International Technical Paper 2009-1-1262, Apr. 2009, 11 pages.

*Primary Examiner* — Justin Seo
*Assistant Examiner* — John M Royston
(74) *Attorney, Agent, or Firm* — Christensen O'Connor Johnson Kindness PLLC

(57) ABSTRACT

A system for estimating an amount of soot in an exhaust particulate filter includes a delta P soot load estimate generator configured to generate a first soot load estimate as a function of a pressure drop and a mass flow of exhaust. The system further includes a model estimate generator configured to generate a second soot load estimate as a function of a modeled engine performance. A trust factor generator is configured to determine a trust factor signal as a function of at least one engine operating characteristic, and a decision generator is configured to determine whether to use the first soot load estimate or the second soot load estimate as a function of the trust factor signal.

9 Claims, 8 Drawing Sheets

(56) References Cited

U.S. PATENT DOCUMENTS

| | | | |
|---|---|---|---|
| 2014/0236482 A1* | 8/2014 | Dorum | G01C 21/32 |
| | | | 701/533 |
| 2015/0267590 A1* | 9/2015 | Sun | F01N 11/002 |
| | | | 60/274 |
| 2016/0061805 A1* | 3/2016 | Prabhu, Sr. | G01N 33/2888 |
| | | | 73/114.55 |

* cited by examiner

COMBINING MODEL AND DELTA PRESSURE BASED SOOT LOAD ESTIMATES

BACKGROUND

Internal combustion engine exhaust emissions, and especially diesel engine exhaust emissions, have recently come under scrutiny with the advent of stricter regulations, both in the U.S. and abroad. While diesel engines are known to be more economical to run than spark-ignited engines, diesel engines inherently suffer disadvantages in the area of emissions. For example, in a diesel engine, fuel is injected during the compression stroke, as opposed to during the intake stroke in a spark-ignited engine. As a result, a diesel engine has less time to thoroughly mix the air and fuel before ignition occurs. The consequence is that diesel engine exhaust contains incompletely burned fuel known as particulate matter, or "soot". In addition to particulate matter, internal combustion engines including diesel engines produce a number of combustion products including hydrocarbons ("HC"), carbon monoxide ("CO"), oxides of nitrogen ("NOx"), and oxides of sulfur ("SOx").

After treatment systems may be utilized to reduce or eliminate emissions of these and other combustion products. For example, diesel particulate filters, such as catalyzed soot filters and others, can be used to trap diesel particulate matter and reduce emissions. The collection, or loading, of soot leads to an increase in exhaust pressure, which may degrade engine performance. To remove the particulate matter, the particulate filter can be passively regenerated by the presence of $NO_2$ in the exhaust. Additionally, particulate filters may undergo active regeneration to eliminate trapped diesel particulate matter by adding external energy into the exhaust stream, thereby raising the temperature of the particulate filter to burn the soot that has accumulated therein. Active regeneration raises the temperature of the particulate filter up to approximately 400 degrees Celsius with a fuel-borne catalyst and up to 600 degrees Celsius without a fuel-borne catalyst.

The frequency of active regenerations impacts both the fuel efficiency of the vehicle and also the usable life of the after treatment system. Excessive regeneration of the particulate filter consumes additional fuel, thereby lowering fuel efficiency and raising operating costs. When too much time elapses between active regenerations, excessive soot builds up in the particulate filter. Because the burning of the soot is exothermic, a regeneration of a particulate filter with excessive soot results in even higher temperatures, which can increase the rate of wear on the after treatment system, thereby reducing the useful life of the system. Therefore, it may be advantageous to vary when a particulate filter is regenerated to reduce fuel consumption and extend after treatment system usable life.

Known methods for determining or estimating the soot load in a particulate filter suffer from various limitations. Thus, there is a need for one or more metrics for accurately and efficiently estimating particulate loading of particulate filters or soot filters in order to perform active regenerations that do not unduly impact fuel consumption or the effective life of the system.

SUMMARY

A first representative embodiment of the disclosed subject matter is a system for estimating an amount of soot in an exhaust particulate filter. The system includes a delta P soot load estimate generator that generates a first soot load estimate as a function of a pressure drop and a volumetric flow of exhaust, and a model estimate generator that generates a second soot load estimate as a function of a modeled engine performance. The system further includes a trust factor generator configured to determine a trust factor signal as a function of at least one engine operating characteristic. A decision generator determines whether to use the first soot load estimate or the second soot load estimate as a function of the trust factor signal.

A second representative embodiment is a method for estimating an amount of soot in an exhaust particulate filter. The method includes generating a first soot load estimate as a function of a pressure drop and a volumetric flow of exhaust and a second soot load estimate as a function of a modeled engine performance. The method further includes determining a trust factor signal as a function of at least one engine operating characteristic. The method then uses the first soot load estimate or the second soot load estimate as a function of the trust factor signal.

Also disclosed is a computer implemented method for determining an amount of soot in an exhaust particulate filter. An electronic control unit determines a first soot load signal as a function of a pressure drop across the particulate filter and passes the signal through a low-pass filter. The electronic control unit also determines a second soot load signal as a function of at least one engine operating characteristic. The electronic control unit determines a binary trust factor signal and utilizes the first soot load signal when the trust factor has a first value and the second soot load signal when the trust factor has a second value.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
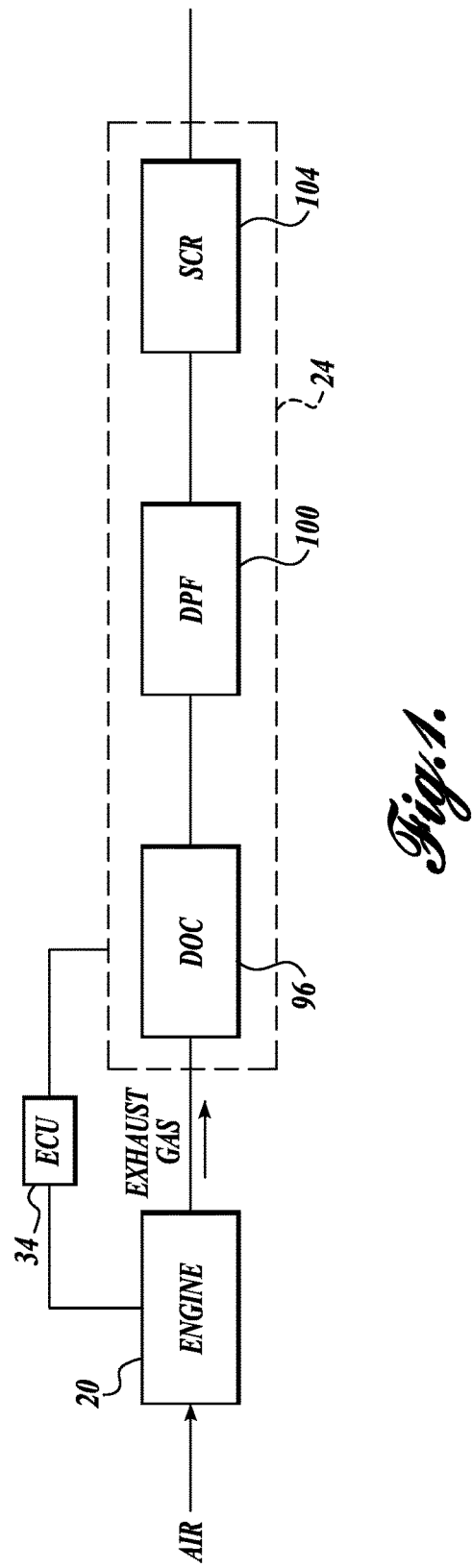
FIG. 1 is a block diagram of one example of an after treatment system coupled to an internal combustion engine in accordance with aspects of the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

The following description sets forth one or more examples of exhaust after treatment systems for internal combustion engine powered vehicles and methods therefor. In some embodiments, logic in the form of one or more routines implemented by one or more components of the exhaust after treatment systems is disclosed. The results from the methods described herein may then be used to estimate the amount of soot present in the particulate filter. This estimated value of soot present in the particulate filter can then be used to determine when an active regeneration cycle should be initiated for the particulate filter.

As will be described in more detail below, embodiments of the present disclosure utilize one or more models that determine the amount of soot present in the particulate filter at a given time. In several embodiments of the present disclosure, the amount of soot present in the particulate filter is based on measured or sensed conditions within the system and predictive calculations based on these conditions. One goal of the present disclosure, among others, is to simplify the on-board calculations and/or equipment needed to determine when to actively regenerate the particulate filter.

Prior to discussing the details of various aspects of the present disclosure, it should be understood that one or more sections of the following description may be presented in terms of logic and operations that may be performed by conventional electronic components. These electronic components, which may be grouped in a single location or distributed over a wide area, generally include controllers, microcontrollers, control units, processors, microprocessors, etc. It will be appreciated by one skilled in the art that any logic described herein may be implemented in a variety of configurations, including but not limited to hardware, software, and combinations thereof. In circumstances were the components are distributed, the components are accessible to each other via communication links.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 2:
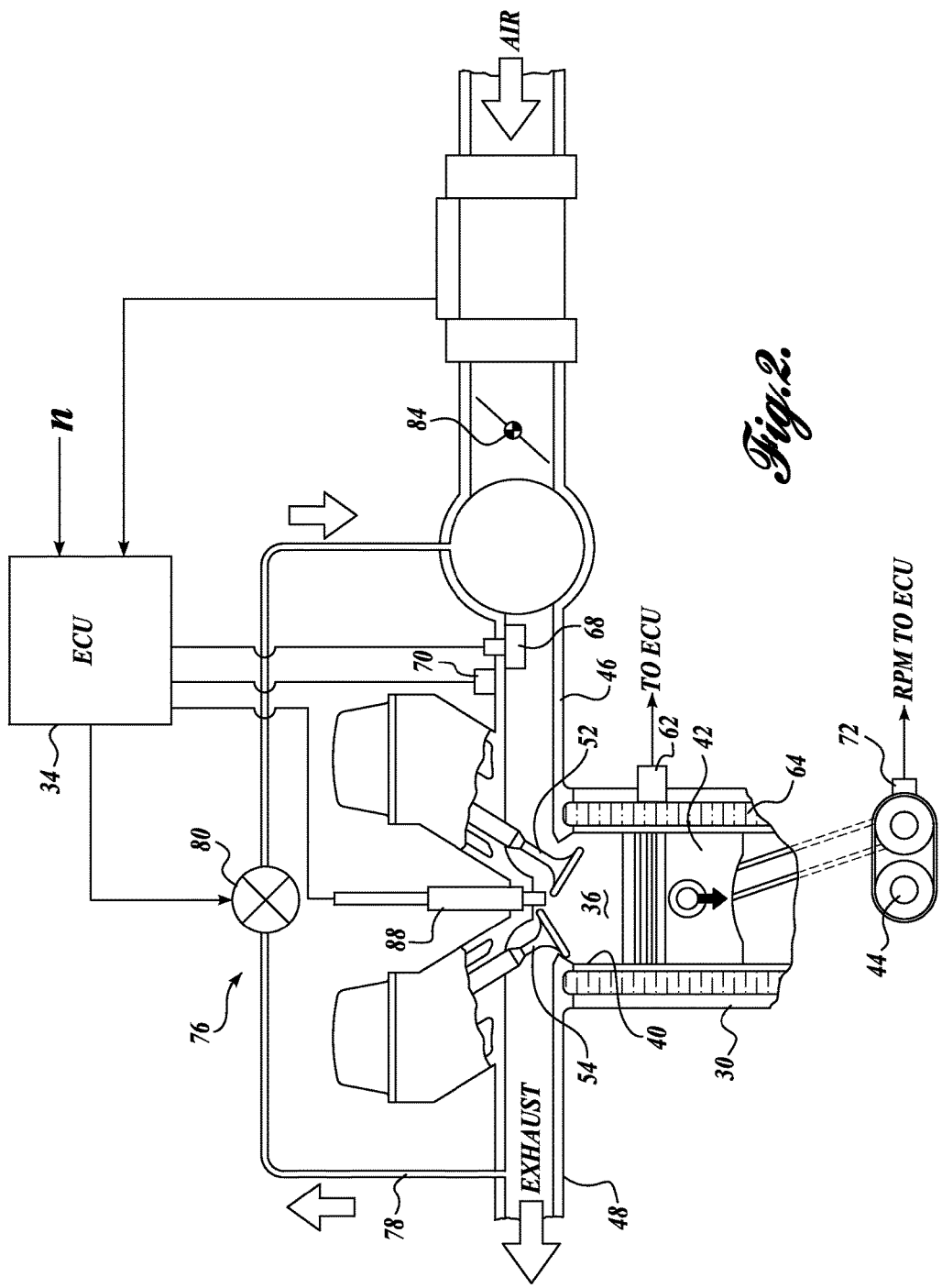
FIG. 2 is a schematic view of one example of an internal combustion engine in accordance with aspects of the present disclosure.

Referring now to FIG. 1, there is shown a block diagram of several components of a vehicle powertrain. The components include an internal combustion engine 20 in flow communication with one or more selected components of an exhaust after treatment system 24. The internal combustion engine 20, comprising a plurality of cylinders, one cylinder 30 of which is shown in FIG. 2, is controlled by electronic control unit 34, sometimes referred to as the engine control unit or ECU. As best shown in FIG. 2, the internal combustion engine 20 includes a combustion chamber 36 and cylinder walls 40 with a piston 42 positioned therein and connected to a crankshaft 44. The combustion chamber 36 is shown communicating with an intake manifold 46 and an exhaust manifold 48 via respective intake valve 52 and exhaust valve 54. In the example of FIG. 2, the internal combustion engine 20 is shown as a direct injection, diesel engine with injector 88 located to inject fuel directly into cylinder 30. Fuel is delivered to fuel injector 88 by a fuel system (not shown), including, for example, a fuel tank, fuel pump, and a high pressure common rail system. In one embodiment, the fuel injector 88 delivers fuel under control of the ECU 34. Both fuel quantity and injection timing may be adjustable.

In addition to those signals previously discussed, the ECU 34 also receives various signals from one or more sensors coupled to engine 20, including but not limited to: engine coolant temperature (ECT) from temperature sensor 62 coupled to cooling sleeve 64; a measurement of manifold pressure (MAP) from pressure sensor 68 coupled to intake manifold 46; a measurement (AT) of manifold temperature from temperature sensor 70; an engine speed signal (RPM) from engine speed sensor 72 coupled to crankshaft 44. As will be described in more detail below, one or more of these and other signals may be stored in memory of the ECU 34 or other data store.

Referring back to FIG. 1, the engine 20 is coupled to the exhaust gas after treatment system 24. As known in the art, combustion of fuel in internal combustion engines produce a number of combustion products including particulates, hydrocarbons ("HC"), carbon monoxide ("CO"), oxides of nitrogen ("$NO_X$"), including NO and $NO_2$, and oxides of sulfur ("$SO_X$"). These combustion products are referred to in both FIGS. 1 and 2 as "exhaust," which exits the exhaust manifold 48 (FIG. 2). In some embodiments, an optional turbocharger (not shown) can be coupled to engine 20 via exhaust manifold 48 and intake manifold 46. The turbocharger may include a compressor in the intake and a turbine in the exhaust coupled via a shaft.

In the embodiment shown in FIG. 2, the engine 20 may further include an exhaust gas recirculation (EGR) system 76 that recirculates the exhaust via piping 78 to the intake manifold 46. The EGR system 76 may further include an EGR control valve 80 that controls the amount of exhaust recirculation of the engine, and receives control signals from the ECU 34. Based on various engine and/or after treatment system operating characteristics, the ECU 34 can control the EGR system 76 in order to provide, for example, two or more EGR modes of operation. For example, a first EGR mode can be an EGR "off" mode wherein the control valve 80 is in a closed state, while a second EGR mode can be an EGR "on" mode wherein the control valve 80 is an open state. In some embodiments, the EGR control valve 80 can be controlled in order to vary the timing and quantity of exhaust presented to the intake manifold 46. In that regards, the EGR "on" mode can be separated into more than one mode, including EGR LOW and EGR HIGH. It will be appreciated that when the EGR system 76 is turned on, the amount of oxygen present in the exhaust decreases. In other embodiments, the engine may additionally or alternatively include a throttle 84.

Returning to FIG. 1, the exhaust after treatment system 24 optionally includes a catalyst system 96 upstream of a particulate filter 100. In the embodiment shown, the catalyst system 96 is a diesel oxidation catalyst (DOC) 96 coupled in flow communication to receive and treat exhaust from the engine 20. The DOC 96 is preferably a flow through device that includes either a honey-comb like or plate-like substrate. The substrate has a surface area that includes a catalyst. The catalyst is typically an oxidation catalyst, which may include a precious metal catalyst, such as one containing platinum, for rapid conversion of hydrocarbons (HC), carbon monoxide (CO) and nitric oxide (NO) in the engine exhaust gas. In one embodiment, the honey-comb like or plate-like substrate is coated with a platinum group metal catalyst.

The oxidation catalyst 96 may also be used to supply heat in the exhaust after treatment system, wherein an exotherm is created when extra HC is reduced over the oxidation catalyst. This can be accomplished through, for example, in-cylinder injection during either or both of a power or exhaust stroke of the engine (in a direct injection engine) or any of a number of other alternatives, such as retarding injection timing, increasing EGR and intake throttling. Alternatively, hydrocarbons may be injected directly into the exhaust gas stream entering the oxidation catalyst. For example, HC from the fuel tank or from a storage vessel may be delivered to the exhaust system to generate heat for heating the particulate filter 100 for active regeneration purposes. As exhaust gas from the engine 20 traverses the catalyst, CO, gaseous HC and liquid HC (unburned fuel and oil) are oxidized. As a result, these pollutants are converted to carbon dioxide and water.

The treated exhaust gases may then proceed to the particulate filter 100, such as a diesel particulate filter (DPF) 100. The DPF 100 is utilized to capture unwanted diesel particulate matter from the flow of exhaust gas exiting engine 20. The diesel particulate matter includes sub-micron size particles found in diesel exhaust, including both solid and liquid particles, and may be classified into several fractions including: inorganic carbon (soot), organic fraction (sometimes referred to as SOF or VOF), and sulfate fraction (sometimes referred to as hydrated sulfuric acid). The DPF 100 can be manufactured from a variety of materials including but not limited to cordierite, silicon carbide, and/or other high temperature oxide ceramics. The DPF 100 also includes at least one catalyst to catalyze the oxidation of trapped particulate and/or exhaust gas components. For example, the catalyst may include a base metal/zeolite formulation with optimum $NO_X$ conversion performance in the range of approximately 200-500 degree C., although any known oxidation catalyst may be used.

Once soot accumulation has reached a predetermined level in the DPF 100, active regeneration can be initiated by the ECU 34. As briefly discussed above, filter regeneration may be accomplished by heating the DPF 100 to a temperature that will burn soot particles at a faster rate than the deposition of new soot particles, for example, 400-600 degrees C. In one example, the DPF 100 can be a catalyzed particulate filter containing a washcoat of precious metal, such as Platinum, to lower the soot combustion temperature and also to oxidize hydrocarbons and carbon monoxide to carbon dioxide and water.

The exhaust after treatment system 24 may further include an optional Selective Catalytic Reduction (SCR) system 104. Reductant, such as aqueous urea, can be stored onboard and injected in the exhaust system upstream of an SCR catalyst. In one embodiment, the SCR catalyst includes a substrate constructed from various ceramic materials, such as titanium oxide, which can be coated with one or more active catalytic components, such as one or more oxides of base metals, zeolites, and/or precious metals.

Figure 3:
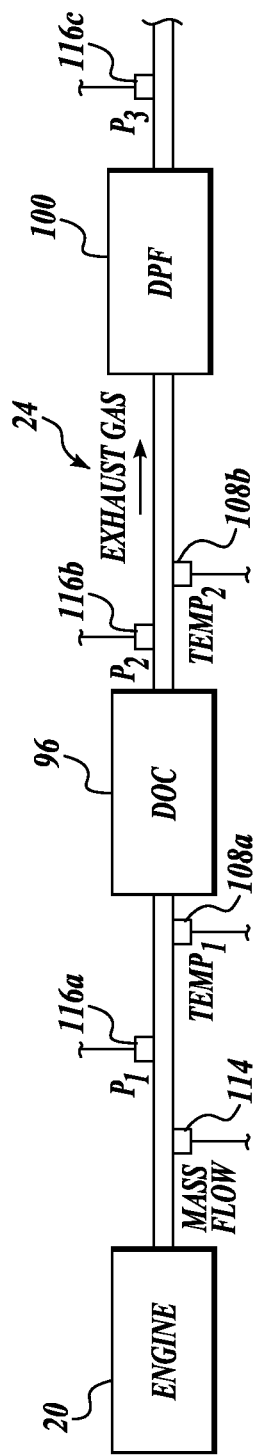
FIG. 3 is a schematic diagram of one example of an after treatment system formed in accordance with aspects of the present disclosure.
Figure 4:
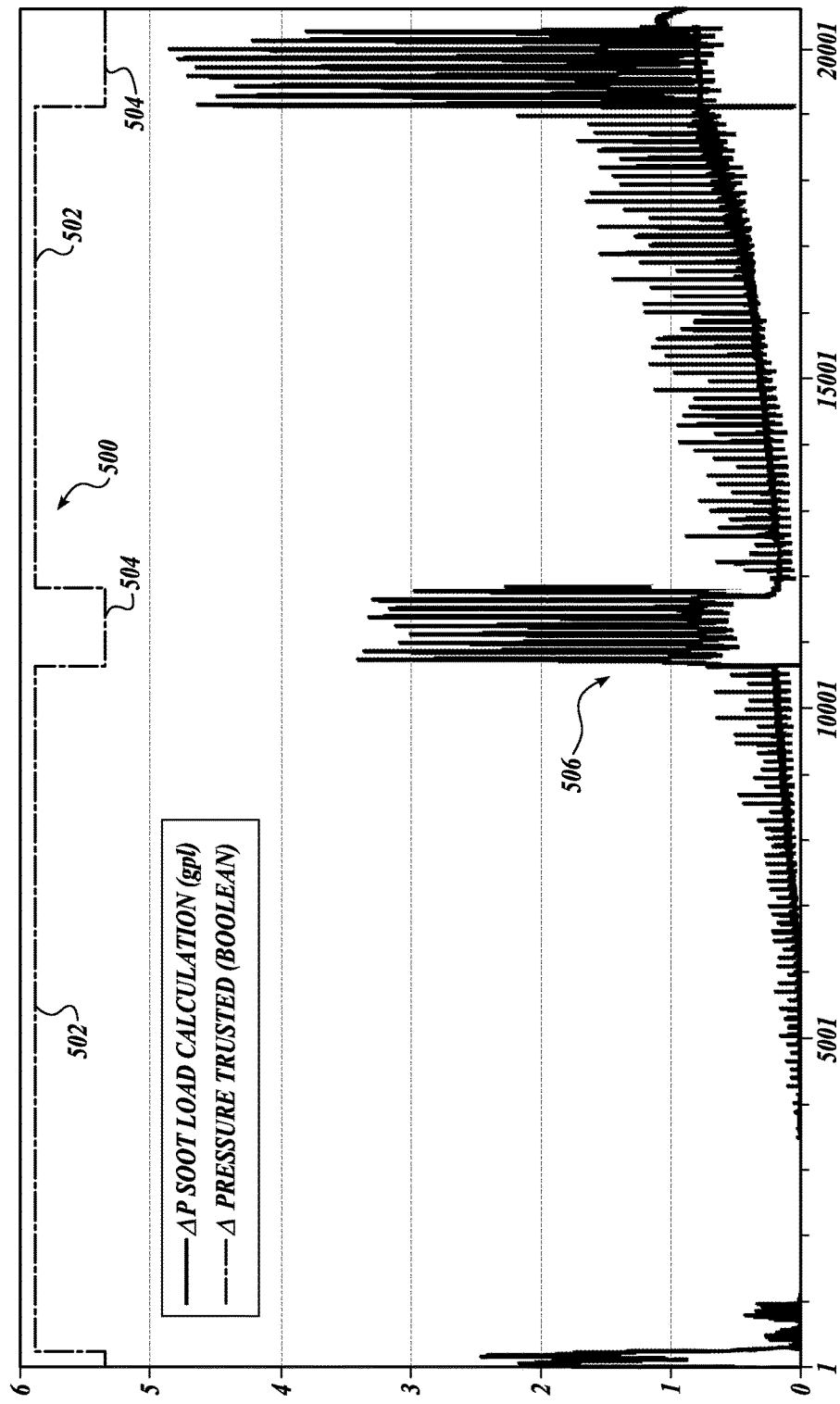
FIG. 4 shows a calculated soot load based on delta P over time generation in accordance with aspects of the present disclosure.

Turning now to FIG. 3, additional components of the system 24 will now be described. As best shown in FIG. 3, the system 24 includes one or more sensors associated with components of the system 24. In one embodiment, the one or more sensors may include one or more temperature sensors 108. As best shown in FIG. 3, at least one temperature sensor 108 is associated with the DPF 100 for measuring the temperature of the exhaust gas as it enters the DPF 100. In other embodiments, two temperature sensors 108a and 108b may be used. In such embodiments, one sensor may be located at the entrance or upstream from the DPF 100 and another sensor may be located at the exit or downstream from the DPF 100. Information from temperature sensor(s) 108 is provided to ECU 34. An algorithm may then be used by ECU 34 to determine the operating temperature of the DOC 96, sometimes referred as the bed temperature of the DOC 96.

In the disclosed exemplary embodiment, the one or more sensors may also include a plurality of pressure sensors 116a, 116b, and 116c located at various locations along the path of the exhaust gases. In the illustrated embodiment, pressure sensors 116b and 116c are used to determine the pressure drop across the DPF 100. Specifically, sensor 116b is located at the entrance or upstream from the DPF 100 and sensor 116c is located at the exit or downstream from the DPF 100. Information from pressure sensor(s) 116 is provided to ECU 34. An algorithm may then be used by ECU 34 to determine the pressure differential across the DPF 100. It will be appreciated that the use of sensors 116b and 116c to determine the pressure drop across the DPF 100 is exemplary only and should not be considered limiting. In this regard, different numbers and types of sensors and sensors in different positions can be utilized to determine the pressure drop, directly or indirectly, and such alternate configuration should be considered within the scope of the present disclosure.

The mass flow sensor 114 may be positioned in fluid communication with the flow of exhaust gas exiting the engine 20, upstream from DPF 100. The mass flow sensor 114 is connected to the ECU 34 and generates electric signals that are indicative of the mass flow rate of the exhaust gas. Signals generated by the aforementioned sensors, among others, are stored in memory of the ECU 34 or other data store(s) and may be utilized by one or more soot load determination applications, as will be described in more detail below. Alternative embodiments are contemplated in which the mass flow is calculated based on various engine operating parameters, thereby making a mass flow sensor 114 located in the exhaust stream unnecessary. Other embodiments are contemplated in which the mass flow sensor is positioned at intake to the cylinders. Fuel flow is then added to the sensed intake flow to calculate mass flow of the exhaust. These and other configurations for measuring the flow of exhaust gases are contemplated and should be considered within the scope of the present disclosure.

A common method for estimating soot accumulation in the DPF 100 is to measure a pressure drop (delta P) across the DPF. This pressure drop in combination with a measured/calculated exhaust flow through the DPF are utilized to estimate the soot load within the DPF. As shown below in equation (1), the pressure drop across the DPF 100 ($\Delta P_{DPF}$) is a function of the mass of soot ($m_{soot}$) in the DPF, the mass of ash ($m_{ash}$) in the DPF, the thickness of the deep bed ($\alpha_{deep\ bed}$), the thickness of the cake ($\alpha_{cake}$), the volumetric flow of exhaust gas ($\dot{V}_{exh}$)) the porosity of the deep bed ($\varphi_{deep\_bed}$)) and the porosity of the cake ($\varphi_{cake}$).

$$\Delta P_{DPF} = f(m_{soot}, m_{ash}, \alpha_{deep\_bed}, \alpha_{cake}, \dot{V}_{exh}, \varphi_{deep\_bed}, \varphi_{cake}) \quad (1)$$

In one exemplary method, the mass flow of the exhaust gas ($\dot{m}_{exh}$), the temperature of the exhaust entering the DPF 100 ($T_{DPF\_in}$), the pressure of the exhaust gas entering the DPF ($P_{DPF\_in}$), and the gas constant (R) of the exhaust gas are used to calculate the volumetric flow of exhaust gas ($\dot{V}_{exh}$) through the DPF according to equation (2).

$$\dot{V}_{exh} = \frac{\dot{m}_{exh} R T_{DPF\_in}}{P_{DPF\_in}} \quad (2)$$

With a sensed pressure drop $\Delta P_{DPF}$, a calculated volumetric flow of exhaust gas $\dot{V}_{exh}$, and an empirically derived constant K, the mass of soot in the DPF is calculated according to equation (3):

$$m_{soot} = K \frac{\Delta P_{DPF}}{\dot{V}_{exh}} \quad (3)$$

It will be appreciated that there are a number of known methods to calculate the mass of the soot in the DPF according to a measured or calculated pressure drop across the DPF. The present disclosure is not limited to any particular one of these methods, and one of ordinary skill in the art would readily appreciate that any number of methods using various combinations of measured or calculated pressure drop could be utilized to estimate the amount of soot in the DPF. In one alternate embodiment, the method includes the use of one or more Look Up Tables (LUTs) correlating various exhaust parameters to a soot load in the DPF. For example, LUTs may be stored in a controller or other suitable storage medium so that the controller or other suitable processor receives various operating parameters and correlates the parameters in the LUTs to a soot load in order to generate a soot load signal. These and other methods for utilizing the pressure drop across the DPF and the volumetric flow of exhaust gas are correlated by the controller to a mass of the soot contained in the DPF and such methods should be considered within the scope of the present disclosure.

Figure 5:
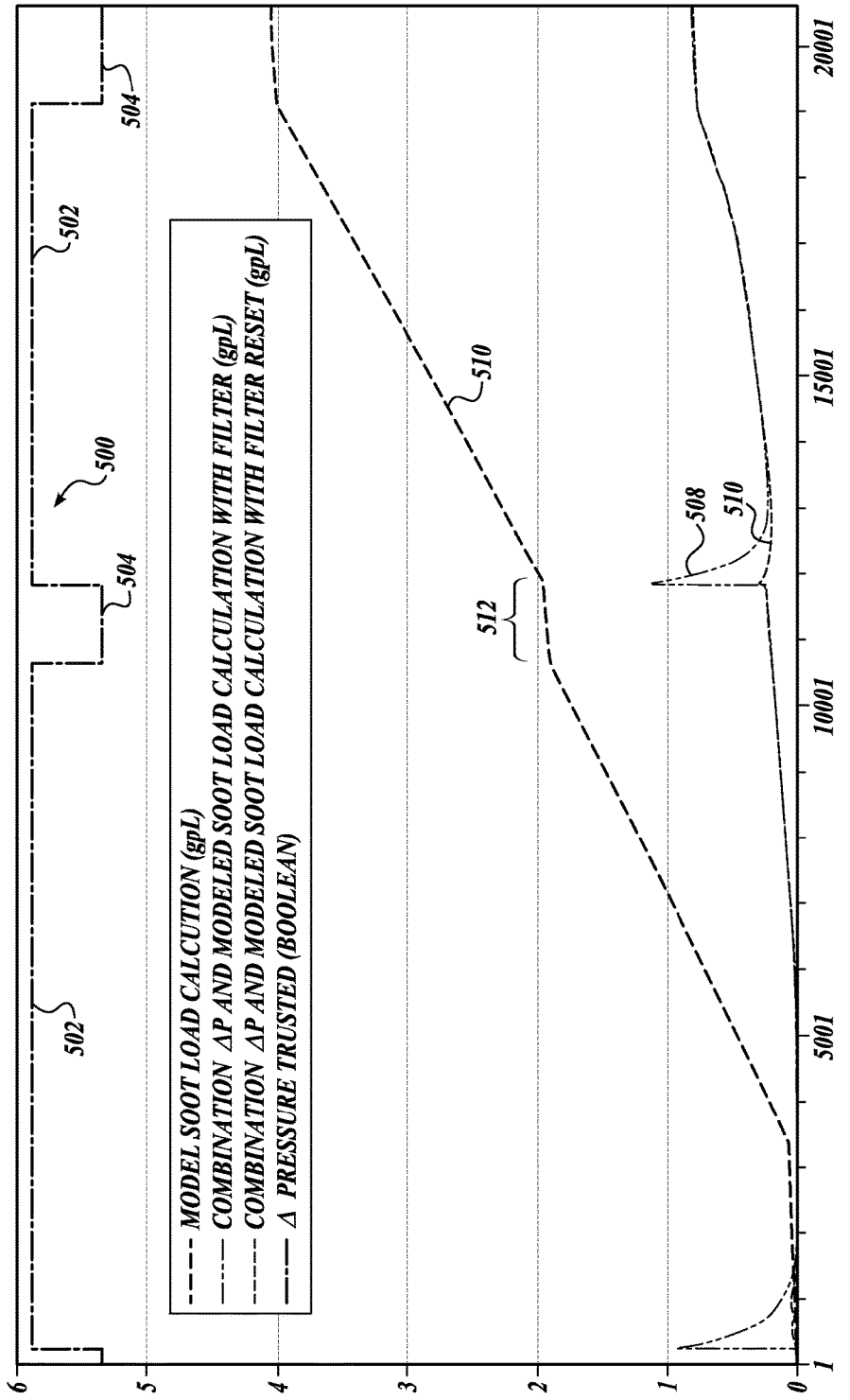
FIG. 5 shows calculated and modeled soot load over time based on various methods in accordance with aspects of the present disclosure.

FIG. 5 shows an exemplary embodiment of a soot load signal 506 calculated over time based on the pressure drop across the DPF. The horizontal axis is time in seconds, and the vertical axis is the DPF soot load in grams per L (gpL). The soot load signal is includes unwanted signal noise, so the system preferably includes a low-pass filter to provide a more stable and accurate signal. It will be appreciated that any suitable hardware, software, or combinations thereof can be utilized to attenuate the soot load signal 506, and such apparatus and methods should be considered within the scope of the present disclosure.

Soot load calculations based on pressure drop across the DPF become inaccurate under certain operating conditions. For example, delta P soot load prediction is inaccurate when the exhaust flow drops below a certain level. Uneven soot distribution within the DPF from high temperature gradients can also decrease the accuracy of a delta P soot load prediction. Passive regenerations and incomplete regenerations can form a barrier membrane layer to prevent soot accumulation in the substrate walls and make the delta P sensor less usable. Further, accumulation of ash over time can decrease the accuracy as well by changing the filter characteristics, such as channel length. As shown in FIG. 5, low exhaust flow causes a spike in the estimated soot load from approximately 10,500-11,600 s and 19,000-20,500 s. After the low exhaust flow condition ends, the estimated soot load returns to a more accurate reading.

Still referring to FIG. 5, line 500 indicates whether or not the operating conditions of the engine are such that the delta P soot load estimate is accurate, i.e., whether or not it can be trusted at a particular time. Generally speaking, embodiments of the disclosed method monitor engine operating conditions, such as engine rpm, engine load, etc. that correlate to conditions under which the delta P soot load estimate can be trusted. In the illustrated embodiment, the method assigns a delta P trust value ($\tau$) according to the operating conditions. If operating conditions indicate that the delta P soot load is accurate, then $\tau$ is assigned a value of 1. If operating conditions indicate that the delta P soot load is not likely accurate, then $\tau$ is assigned a value of 0. Thus, $\tau$ represents a binary trust factor for the delta P soot load estimate. In FIG. 5, line 500 indicates $\tau=1$ with raised positions 502 and indicates $\tau=0$ with lowered portions 504.

Figure 6:
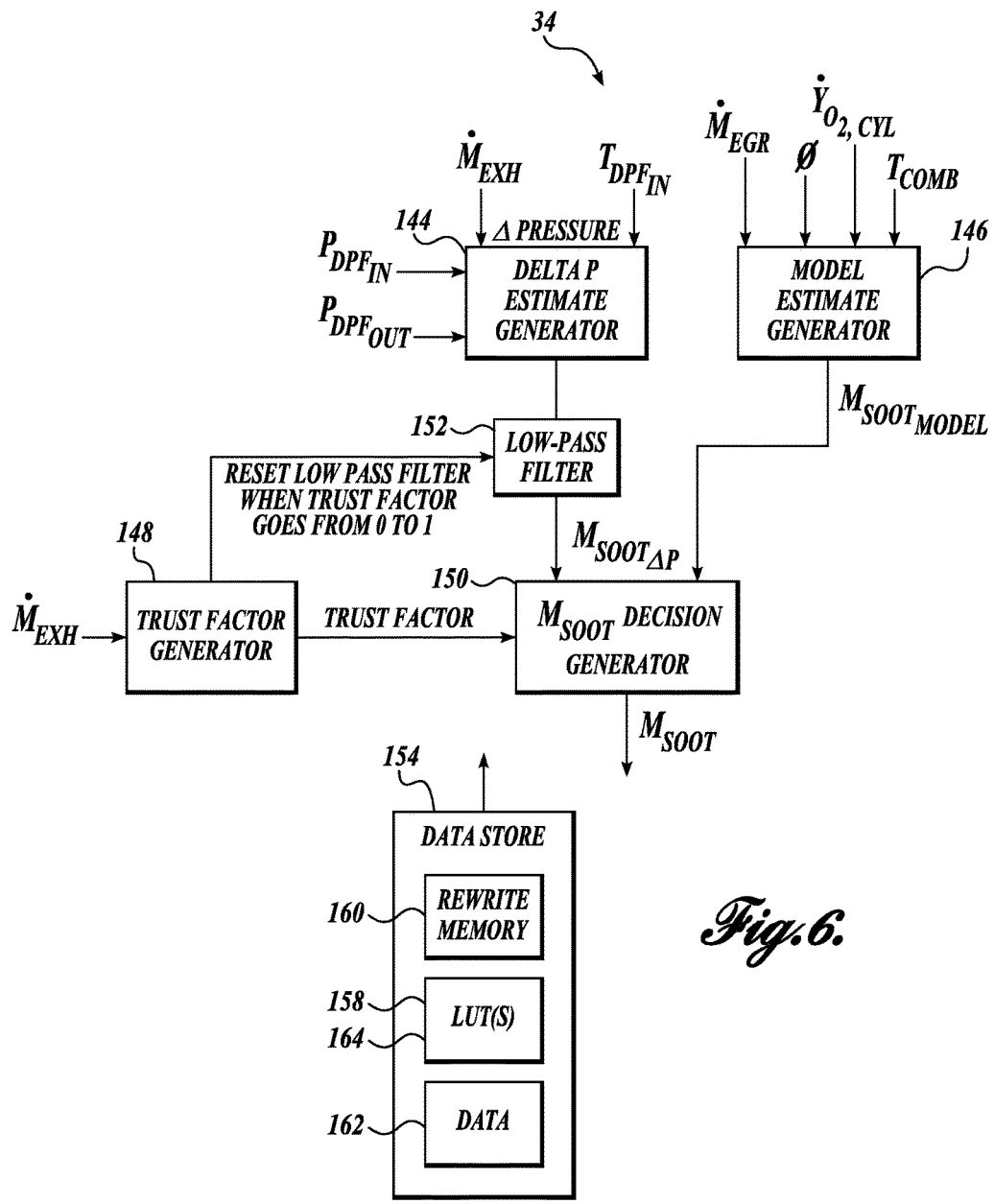
FIG. 6 is a disclosed example of an electronic control unit (ECU) of the after treatment system of FIG. 3.

Referring now to FIG. 6, an alternative to delta P soot load predictions is a modeled soot load prediction, indicated by line 510. Modeled soot load predictions may be utilize engine performance characteristics in conjunction with empirical data, i.e., LTUs to determine the amount of soot produced by combustion in the engine, which in turn can be correlated to the rate at which soot load in the DPF increases. In one exemplary embodiment, shown below in equations (4)-(6), a modeled soot load includes calculating the net soot accumulation rate in the DPF by accounting for the amount of soot coming out of the engine and then subtracting the soot that gets oxidized from passive and/or active regenerations. The engine out soot can be modeled as a function of combustion parameters, such as the equivalence ratio$\emptyset$ (or air to fuel ratio), the amount of oxygen at the intake manifold $Y_{(O\_2, Cyl)}$, combustion temperatures T_comb and the injection timing and the EGR quantities $\dot{m}$_EGR. The passive soot oxidation rate can be modeled from the amount of $NO_2$ entering the DPF $Y_{NO_2, DPF\_in}$ and the exhaust temperatures $T_{DPF,bed}$. The active soot oxidation rates can be modeled from the exhaust temperatures and the available O2 $Y_{O_2, DPF\_in}$ in the exhaust.

$$\dot{m}\_EOSoot = f(\emptyset, Y_{O_2, Cyl}, T_{comb}, \dot{m}_{EGR}, \ldots) \quad (4)$$

$$\dot{m}_{SootOx} = \dot{m}_{SootAct} + \dot{m}_{SootPass} \quad (5)$$

$$\dot{m}_{SootOx} = K_{act} m_{soot} Y_{O_2, DPF\_in} \frac{E_{a,act}}{e^{RT_{DPF,bed}}} + K_{pass} m_{soot} Y_{NO_2, DPF\_in} \frac{E_{a,pass}}{e^{RT_{DPF,bed}}} \quad (6)$$

Simpler modeling predictions can be implemented by using LUTs based on the engine RPM and load. Other implementations may include variations of the above equations according to the application needs. For example, some applications may not have significant passive regenerations, so the corresponding term can be dropped.

The modeled soot load predictions are generally less effective at accurately determining soot load. In this regard, the modeled predictions do not provide as direct a measurement as the delta P soot load estimates. In addition, systems for producing modeled soot load predictions require more extensive and more frequent calibration to ensure accurate readings.

Still referring to FIG. 6, the presently disclosed method uses a delta P soot load estimate in conjunction with a modeled soot load estimate to provide a soot load estimate that is less susceptible to inaccuracies of either of the individual estimates. As shown below in equation (7), when τ=1, the delta P soot load estimate is used. When τ=0, the modeled soot load estimate is used.

$$m_{soot} = \begin{cases} K\dfrac{\Delta P_{DPF}}{\dot{V}_{exh}} & \text{for } \tau = 1 \\ \int \dot{m}_{EOSoot} - \int \dot{m}_{SootOx} & \text{for } \tau = 0 \end{cases} \quad (7)$$

where τ=ƒ(operating conditions)

Still referring to FIG. 6, line 508 indicates a delta P soot load estimate in accordance with equation (7). For the portions of the line 508 corresponding to periods in which the delta P soot load estimate is trusted (τ=0), the delta P soot load, which has been processed by a low-pass filter 152 to remove signal noise. In the illustrated example, the low-pass filter 152 processes the trusted portion of the signal 506 shown in FIG. 5, i.e., (τ=1), into the trusted portion of the signal 508 shown in FIG. 6, When the operating conditions change from trusted (τ=1) to untrusted (τ=0), the estimated change in soot load is determined by the modeled soot load. As shown in FIG. 6, the value of the modeled soot load 510 is greater than the delta P value of the soot load 508. Accordingly, to avoid the need to calibrate the modeled soot load signal, the change on modeled soot during the untrusted period is added to the last trusted delta P soot load estimate. That is, the portion of line 510 from an untrusted section, shown in FIG. 5, is transposed onto the last trusted delta P point on line 508 so that increase in soot from the trusted last delta P point is the increase predicted by the modeled soot load.

When the operating conditions change from untrusted (τ=1) to trusted (τ=0), the soot load estimate reverts back to delta P soot load estimate. Although the operating conditions indicate that the delta P soot load estimate can be trusted, when the data used to calculate the delta P soot load does not instantaneously return to a state that the P soot load estimate can be trusted. In this regard, line 508 shows a spike in estimated soot load immediately after the operating conditions return to the trusted state, which is caused by a lag between (1) the operating conditions returning to the trusted state and (2) the delta P soot load estimate producing accurate results. To account for this lag, the low-pass filter 152 is reset, thereby mitigating the spike in the estimated soot load line 508. Line 510 in FIG. 6 shows the estimated soot load with the filter reset after the operating conditions return to a trusted state. It will be appreciated that the line 510 reduces the spike in estimated soot load after the operating conditions return to a trusted state, thereby providing a more reliable estimate of soot load in the DPF. This in turn reduces the instances of regeneration triggered by a temporary spike in the estimated soot load to reduce the number of unnecessary regenerations.

Referring now to FIG. 6, there is illustrated a functional block diagram of one example of the ECU 34. It will be appreciated that the ECU 34 can be implemented in a variety of hardware, software, and combination hardware/software configurations, for carrying out aspects of the present disclosure. It will be appreciated that the functions carried out by the ECU 34 related to the after treatment of exhaust may be alternatively carried out by a discrete controller associated with the after treatment system 24 or integrated or associated with another one or more controllers of the vehicle, such as the engine control module, among others.

In the embodiment shown in FIG. 6, the ECU 34 may include but is not limited to a delta P soot load estimate generator 144, a soot load model estimate generator 146, a trust factor generator 148, and a soot load decision generator 150. The ECU 34 may receive data from one or more data stores 154. In one embodiment, the one or more data stores 154 may include a delta P soot load LUT 158, a modeled soot load LUT 164, a rewriteable memory section 160, and data 162, such as the exhaust gas constant (R), a delta P soot load constant (K), etc. In some embodiments, the LUT 158 is a multi-variable LUT, and may be generated from empirically derived data as a function of exhaust temperature, exhaust mass flow, and delta P across the DPF. Accordingly, with temperature, mass flow, and pressure values, the LUT 158 is capable of outputting a value representing a soot load estimate.

Still referring to FIG. 6, in one embodiment, the delta P soot load generator 144 generates a soot load estimate as previously described according to equation (3). As such, a soot load estimate can be determined with data from one or more sensors 108, 114, 116, in addition to data stored in memory section 160. The soot load model estimate generator 146 generates a soot load estimate as previously described according to equations (4) through (6). The delta P and the modeled soot load estimates are provided to the $m_{soot}$ decision generator 150 along with a trust factor signal provided by the trust factor generator 148. The $m_{soot}$ decision generator 150 outputs a soot load estimate according to equation (7).

Figure 7:
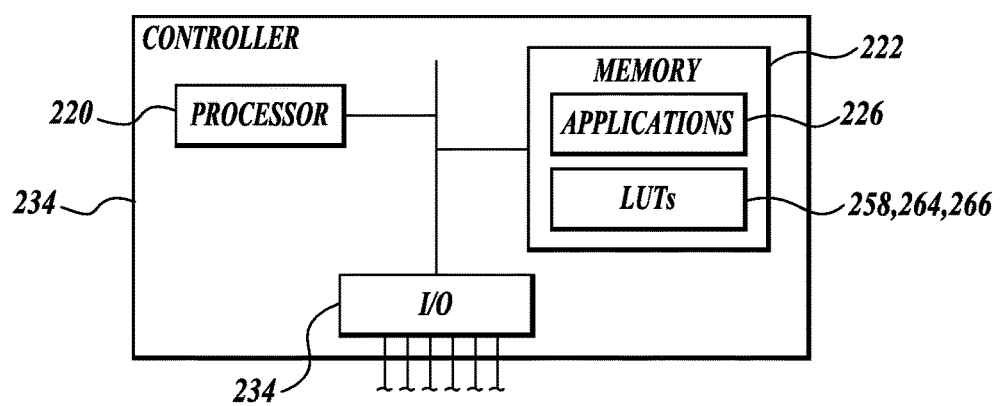
FIG. 7 is a disclosed alternate example of an ECU of the after treatment system of FIG. 3.

FIG. 7 depicts another embodiment of the ECU, generally designated 234, in accordance with aspects of the present disclosure. The ECU 234 is depicted as a computing device that includes a processor 220, a memory 222, and I/O circuitry 224 suitably interconnected via one or more buses. In this regard, the processor 220 is configured to execute instructions and to carry out operations defined in one or more applications 226 or program modules that reside in the memory 222. The memory 222 depicted in FIG. 7 is one example of computer-readable media suited to store data, such as sensor data and program data in the form of one or more look up tables (LUTs), and program modules that implement aspects of the disclosed subject matter. The ECU 234 is connected in communication with one or more sensors, such as sensors 108-116, etc., and other data sources via the I/O circuitry 224.

By way of example, and not limitation, computer readable media includes volatile and non-volatile and removable and non-removable memory, implemented in any method or technology capable of storing information, such as computer-readable instructions, data structures, program modules, or other data. By way of example, computer readable media include, but are not limited to, RAM, ROM, EPROM, EEPROM, flash memory, CD-ROM, digital versatile disks (DVD), etc., or any other medium that can be used to store information for access by the processor 220.

The memory 222 may include program modules, applications, and the like that include algorithms or routines configured to perform operations that are executable by the processor 220. In that regard, the memory 222 includes a soot load determination application for determining the amount of soot present in the DPF 100. Additionally, the memory 222 may include single or multi-dimensional performance maps or look-up tables (LUTs) that are accessed by the processor 220. One such LUT includes a soot load LUT 258 for determining a soot accumulation based on delta P across the DPF 100. The LUT 258 is a multi-variable LUT, and is generated from empirically derived data as a function of $\Delta P_{exh}$ and $\dot{V}_{exh}$. Accordingly, with known $\Delta P_{exh}$ and $\dot{V}_{exh}$ values, the LUT 258 is capable of outputting a value representing a soot load. The memory 222 in other embodiments may also include one or more additional LUTs 264 and 266 that include data in the form of engine performance characteristics that can be utilized to estimate soot load based on a model of the engine performance.

Figure 8:
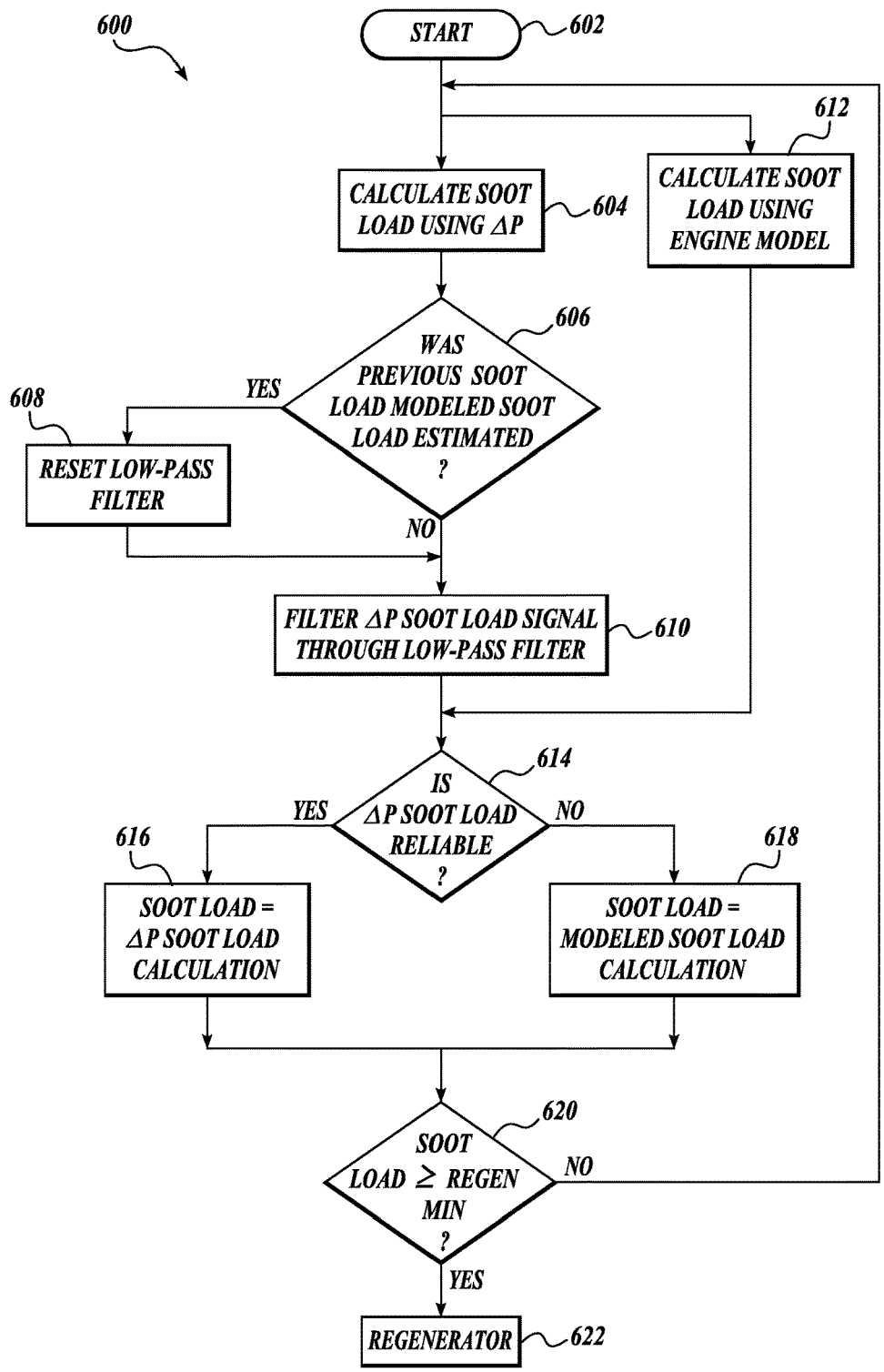
FIG. 8 shows a method of combining a pressure based soot load and a modeled soot load in accordance with aspects of the present disclosure.

Referring now to FIG. 8, one example of a method 600 is set forth for determining the soot load, i.e., the amount of soot present in the DPF 100. The method 600 may be implemented by one or more components, including ECUs 34, 234, etc. described above. With the results of such determination, timing and/or length of regeneration of the DPF can be controlled.

The method begins at block 602 and proceeds to block 604, where delta P soot load is calculated. Next, at block 606, it is determined whether the method has just proceeded from a trusted to an untrusted engine operation. If the method has just proceeded from a trusted to an untrusted engine operation, the low-pass filter is reset at block 608, and the delta P signal is passed through the low-pass filter at block 610. If the method has not just proceeded from a trusted to an untrusted engine operation, the method proceeds directly to block 610, where the delta P signal is passed through the low-pass filter.

As the delta P soot load is calculated in blocks 604 through 610, the method also calculates the soot load using an engine model in block 612. At block 614, it is determined if the delta P soot load is reliable. If the delta P soot load is reliable, the method proceeds to block 616, and the soot load is determined by the delta P soot load calculation from blocks 604 through 610. If the delta P soot load is not reliable, the method proceeds to block 618, and the soot load is determined by the modeled soot load calculation from block 612. Next the method proceeds to block 620, where the soot load is compared to a predetermined soot load level. If the soot load is greater than or equal to the predetermined soot load level, the method proceeds to block 622, and a regeneration cycle is initiated. If the soot load is less than the predetermined soot load level, then the method returns to block 604 for continued soot load calculation.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure.

The embodiments of the invention in which an exclusive property or privilege is claimed are defined as follows:

1. A system for estimating an amount of soot in an exhaust particulate filter, comprising:
   (a) a delta P soot load estimate generator configured to generate a first soot load estimate as a function of a pressure drop and a mass flow of exhaust;
   (b) a model estimate generator configured to generate a second soot load estimate as a function of a modeled engine performance;
   (c) a trust factor generator configured to calculate a trust factor binary signal from at least one engine operating characteristic selected from engine rpm and engine load, wherein the trust factor binary signal is one of two values, wherein the first value represents a trusted delta P soot load estimate and the second value represents an untrusted delta P soot load estimate; and
   (d) a decision generator that calculates the amount of soot in the exhaust particulate filter according to the first soot load estimate when the trust factor binary signal is the first value, and the decision generator calculates the amount of soot in the exhaust particulate filter according to the second soot load estimate when the trust factor binary signal is the second value.

2. The system of claim 1, further comprising a low-pass filter configured to filter a signal received from the delta P soot load estimate generator.

3. The system of claim 2, wherein the low-pass filter is configured to reset when the trust factor signal changes from a first value to a second value.

4. The system of claim 3, wherein the system is configured to start a regeneration cycle when a soot load estimate being used is greater than a predetermined maximum value.

5. A method for estimating an amount of soot in an exhaust particulate filter, the method comprising:
   (a) generating a first soot load estimate as a function of a pressure drop and a mass flow of exhaust;
   (b) generating a second soot load estimate as a function of a modeled engine performance;
   (c) calculating a trust factor binary signal from at least one engine operating characteristic selected from engine rpm and engine load, wherein the trust factor binary signal is one of two values, wherein the first value represents a trusted delta P soot load estimate and the second value represents an untrusted delta P soot load estimate; and
   (d) calculating the amount of soot in the exhaust particulate filter according to the first soot load estimate when the trust factor binary signal is the first value and calculating the amount of soot in the exhaust particulate filter according to the second soot load estimate when the trust factor binary signal is the second value.

6. The method of claim 5, wherein the step of generating a first soot load estimate comprises:
   (a) generating a load estimate signal; and
   (b) passing the load estimate through a low-pass filter.

7. The method of claim 6, further comprising resetting the low pass signal when the trust factor signal changes from the second value to the first value.

8. A computer implemented method for determining an amount of soot in an exhaust particulate filter, the method comprising, in an electronic control unit:
   (a) determining a first soot load signal as a function of a pressure drop across the particulate filter and passing the signal through a low-pass filter;
   (b) determining a second soot load signal as a function of at least one engine operating characteristic;
   (c) calculating a trust factor binary signal from at least one engine operating characteristic selected from engine rpm and engine load, wherein the trust factor binary signal is one of two values, wherein the first value represents a trusted delta P soot load estimate and the second value represents an untrusted delta P soot load estimate; and (d) calculating the amount of soot in the exhaust particulate filter according to the first soot load estimate when the trust factor binary signal is the first value, and calculating the amount of soot in the exhaust particulate filter according to the second soot load estimate when the trust factor binary signal is the second value.

9. The computer implemented method of claim 8, further comprising resetting the low-pass filter when the trust factor changes from the second value to the first value.

\* \* \* \* \*